United States Patent
Suzuki (10) Patent No.: US 8,111,276 B2
(45) Date of Patent: Feb. 7, 2012

(54) OPTICAL SCANNING DEVICE AND IMAGE FORMING APPARATUS WITH A CENTER ADJUSTING MECHANISM

(75) Inventor: Mitsuo Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 148 days.

(21) Appl. No.: 12/533,696

(22) Filed: Jul. 31, 2009

(65) Prior Publication Data

US 2010/0046967 A1 Feb. 25, 2010

(30) Foreign Application Priority Data

Aug. 25, 2008 (JP) ................................ 2008-215154

(51) Int. Cl.
  *B41J 15/14* (2006.01)
  *B41J 27/00* (2006.01)
  *G02B 26/08* (2006.01)

(52) U.S. Cl. ...................... 347/243; 347/259; 359/298.1

(58) Field of Classification Search .................. 347/231, 347/243, 249–250, 259, 260; 359/197.1–199.1, 359/301.2, 213.1, 214.1, 225.1, 226.2
See application file for complete search history.

(56) References Cited

U.S. PATENT DOCUMENTS

| | | | |
|---|---|---|---|
| 4,726,640 A | 2/1988 | Iwama et al. | |
| 5,069,515 A | 12/1991 | Itami et al. | |
| 5,726,699 A | 3/1998 | Itami et al. | |
| 5,739,602 A | 4/1998 | Suzuki et al. | |
| 5,769,544 A | 6/1998 | Suzuki et al. | |
| 6,580,186 B1 | 6/2003 | Suzuki et al. | |
| 6,778,203 B2 | 8/2004 | Itami et al. | |
| 6,822,775 B2 | 11/2004 | Suzuki et al. | |
| 6,937,372 B2 * | 8/2005 | Kandori et al. | 359/198.1 |
| 6,995,357 B2 * | 2/2006 | Bush et al. | 250/235 |
| 7,045,773 B2 | 5/2006 | Suzuki et al. | |
| 7,050,082 B2 | 5/2006 | Suzuki et al. | |
| 7,167,288 B2 | 1/2007 | Miyatake et al. | |
| 7,403,316 B2 | 7/2008 | Amada | |
| 7,436,567 B2 * | 10/2008 | Ueyama | 359/224.1 |
| 7,495,813 B2 * | 2/2009 | Akiyama et al. | 359/204.1 |
| 7,542,191 B2 * | 6/2009 | Kadowaki | 359/214.1 |
| 7,583,417 B2 * | 9/2009 | Bush et al. | 358/474 |
| 7,729,031 B2 * | 6/2010 | Nakamura et al. | 359/212.1 |
| 2006/0209166 A1 | 9/2006 | Suzuki et al. | |
| 2007/0236557 A1 | 10/2007 | Imai et al. | |
| 2008/0068678 A1 | 3/2008 | Suzuki et al. | |
| 2008/0088889 A1 | 4/2008 | Suzuki | |
| 2008/0170282 A1 | 7/2008 | Amada et al. | |
| 2008/0204846 A1 | 8/2008 | Itabashi et al. | |
| 2009/0147336 A1 | 6/2009 | Suzuki et al. | |
| 2009/0153933 A1 | 6/2009 | Tsuchiya et al. | |

FOREIGN PATENT DOCUMENTS

| | | |
|---|---|---|
| JP | 2007-155984 A | 6/2007 |
| JP | 2007-171854 A | 7/2007 |
| JP | 2007-178817 A | 7/2007 |

* cited by examiner

*Primary Examiner* — Hai C Pham (74) *Attorney, Agent, or Firm* — Dickstein Shapiro LLP (57) ABSTRACT

An optical scanning device deflects a light beam emitted from a light source device by a vibrating mirror, scans a scanning surface with deflected light beam, and focuses the light beam onto the scanning surface by a scanning imaging optical system. The optical scanning device includes an offset detecting unit that detects an offset that is a deviation between a center of vibration amplitude of the vibrating mirror and a center of an optical scanning area and an adjusting unit that adjusts the center of the vibration amplitude when the offset detected by the offset detecting unit is larger than a predetermined value.

2 Claims, 11 Drawing Sheets

OPTICAL SCANNING DEVICE AND IMAGE FORMING APPARATUS WITH A CENTER ADJUSTING MECHANISM

CROSS-REFERENCE TO RELATED APPLICATIONS

The present application claims priority to and incorporates by reference the entire contents of Japanese Patent Application No. 2008-215154 filed in Japan on Aug. 25, 2008.

BACKGROUND OF THE INVENTION

1. Field of the Invention

The present invention relates to an optical scanning device that uses a vibrating mirror as a light deflector and an image forming apparatus that includes the optical scanning device.

2. Description of the Related Art

Japanese Patent Application Laid-open No. 2007-155984 discloses an optical scanning device that uses a vibrating mirror as a light deflector and an image forming apparatus that includes the optical scanning device. The optical scanning device scans a target surface with a light beam in the main-scanning direction. The optical scanning device includes a light source that emits a light beam, a movable member that has a deflection mirror surface, and a vibrating unit that vibrates to drive the movable member around a drive axis in a direction substantially perpendicular to the main-scanning direction due to an expansion and contraction movement of at least one piezoelectric actuator. The optical scanning device further includes a deflecting unit that deflects the light beam emitted by the light source by using the deflection mirror surface, thereby causing the target surface to be scanned with the deflected light beam in the main-scanning direction. In addition, the optical scanning device includes a mirror driving unit that vibrates the movable member by applying a mirror drive signal to the piezoelectric actuators, wherein the mirror drive signal has a periodically changing voltage. The mirror driving unit applies a signal generated by adding an offset voltage to the mirror drive signal to all or some of the piezoelectric actuators, thereby adjusting the center of the vibration of the deflection mirror surface. The offset voltage is used to displace the center of the vibration of the deflection mirror surface, and the amount of displacement of the center of the vibration is determined based on the offset voltage.

According to Japanese Patent Application Laid-open No. 2007-155984, the center of the vibration of the deflection mirror surface is adjusted by applying the offset voltage. The size of a drive circuit for applying the offset voltage to a piezoelectric element needs to be large to adjust the center of the vibration of the deflection mirror surface with high accuracy. Furthermore, although the center of the vibration of the deflection mirror surface is adjusted in a forcible manner, it can be only adjusted within a limited range. Moreover, because the optical scanning device is designed to allow for large vibration amplitude of a torsion bar, the piezoelectric actuator needs to have high drive capability; therefore the piezoelectric actuator needs to be large and high costs are incurred.

In an image forming apparatus such as a color image forming apparatus that uses a polygon scanner as a light deflector, the polygon scanner needs to be rotated at a speed higher than 25,000 revolutions per minute (rpm) with high accuracy in order to achieve high-speed printing and high image quality. However, there are problems with the above apparatus. Because of the high image quality achieved by reducing the diameter of a laser beam, a polygon mirror used in the polygon scanner has an incircle with a relatively large radius and relatively long length in the main-scanning direction; therefore, the load on a polygon motor that drives the polygon mirror is likely to be heavy. Due to the heavy load on the polygon motor, electric power consumption of the polygon scanner is increased and heat generated by the polygon scanner adversely affects optical elements such as a scanning lens. The scanning lens is affected by the heat most severely because the scanning lens is located closest to the polygon scanner. The heat of the polygon scanner is transmitted to the scanning lens via an optical housing or due to radiation, resulting in an increase in temperature.

The temperature increase of the scanning lens is not uniform due to its distance from the polygon scanner, i.e., the heat generation source in this case, different coefficients of thermal expansion depending on the material of each component, and influence of air currents. Particularly, if the scanning lens has a temperature distribution in the longitudinal direction, i.e., in the main-scanning direction, the form accuracy of the scanning lens is decreased and the refractive index of the scanning lens is altered. As a result, a spot position of the laser beam on the target surface varies and the quality of formed images deteriorates. These problems become noticeable if the scanning lens is made of plastic having a high coefficient of thermal expansion. Furthermore, in the color image forming apparatus, because target surfaces are individually scanned by laser beams corresponding to four colors, i.e., yellow, magenta, cyan, and black, temperature deviation occurs between optical scanning devices that correspond to the four colors. The temperature deviation causes incorrect relative positions of beam spots that correspond to the four colors, which results in color shift of images.

The increase in temperature due to the heat generated by the heavily loaded polygon mirror causes a slight displacement of components included in a rotating body, especially the polygon mirror that constitutes a large fraction of the rotating body's total mass. The slight displacement alters the balance of the rotating body, which results in the occurrence of vibration. If components included in the rotating body, such as the polygon mirror, a rotor magnet of the polygon motor, a flange to which the rotor magnet is attached, or a shaft, have different coefficients of thermal expansion, or even if these components have the same coefficient of thermal expansion, the components included in the rotating body are slightly displaced (the balance of the rotating body is altered) due to the high speed rotation of the polygon mirror at the increased temperature whereby the vibration is increased. To prevent such a problem, component tolerances and methods for fixing the components need to be strictly controlled and monitored. The vibration is transmitted to an optical element included in the optical scanning device. This optical element can be a mirror that changes an optical path. The vibration is amplified by the optical element whereby banding (density variation in the sub-scanning direction) occurs, and as a result, image deterioration and noise are caused.

SUMMARY OF THE INVENTION

It is an object of the present invention to at least partially solve the problems in the conventional technology.

According to one aspect of the present invention, there is provided an optical scanning device that deflects a light beam emitted from a light source device by a vibrating mirror, scans a scanning surface with deflected light beam, and focuses the light beam onto the scanning surface by a scanning imaging optical system. The optical scanning device includes an offset detecting unit that detects an offset that is a deviation between a center of vibration amplitude of the vibrating mirror and a center of an optical scanning area and an adjusting unit that adjusts the center of the vibration amplitude when the offset detected by the offset detecting unit is larger than a predetermined value.

Furthermore, according to another aspect of the present invention, there is provided an image forming apparatus that forms an electrostatic latent image on a photosensitive element by scanning a surface of the photosensitive element with an optical beam emitted from a light source device and obtains a desired recording image by developing the latent image with toner. The image forming apparatus includes an optical scanning device that deflects the light beam by a vibrating mirror, scans the surface of the photosensitive element with deflected light beam, and focuses the light beam onto the surface of the photosensitive element by a scanning imaging optical system. The optical scanning device includes an offset detecting unit that detects an offset that is a deviation between a center of vibration amplitude of the vibrating mirror and a center of an optical scanning area and an adjusting unit that adjusts the center of the vibration amplitude when the offset detected by the offset detecting unit is larger than a predetermined value.

Moreover, according to still another aspect of the present invention, there is provided an image forming apparatus that includes a plurality of photosensitive elements corresponding to a plurality of color components, forms electrostatic latent images of different colors on the photosensitive elements by scanning surfaces of the photosensitive elements with corresponding light beams emitted from a light source device, respectively, and obtains a color image by developing the latent images with toner and transferring developed images onto a recording medium in a superimposed manner. The image forming apparatus includes an optical scanning device that deflects the light beams by a vibrating mirror, scans the surfaces of the photosensitive elements with deflected light beams, and focuses the light beams onto the surfaces of the photosensitive elements, respectively, by a scanning imaging optical system. The optical scanning device includes an offset detecting unit that detects an offset that is a deviation between a center of vibration amplitude of the vibrating mirror and a center of an optical scanning area and an adjusting unit that adjusts the center of the vibration amplitude when the offset detected by the offset detecting unit is larger than a predetermined value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

An image forming apparatus according to the embodiments is, for example, a copier, a scanner, a facsimile, a printer, or a multifunction product (MFP).

Figure 1:
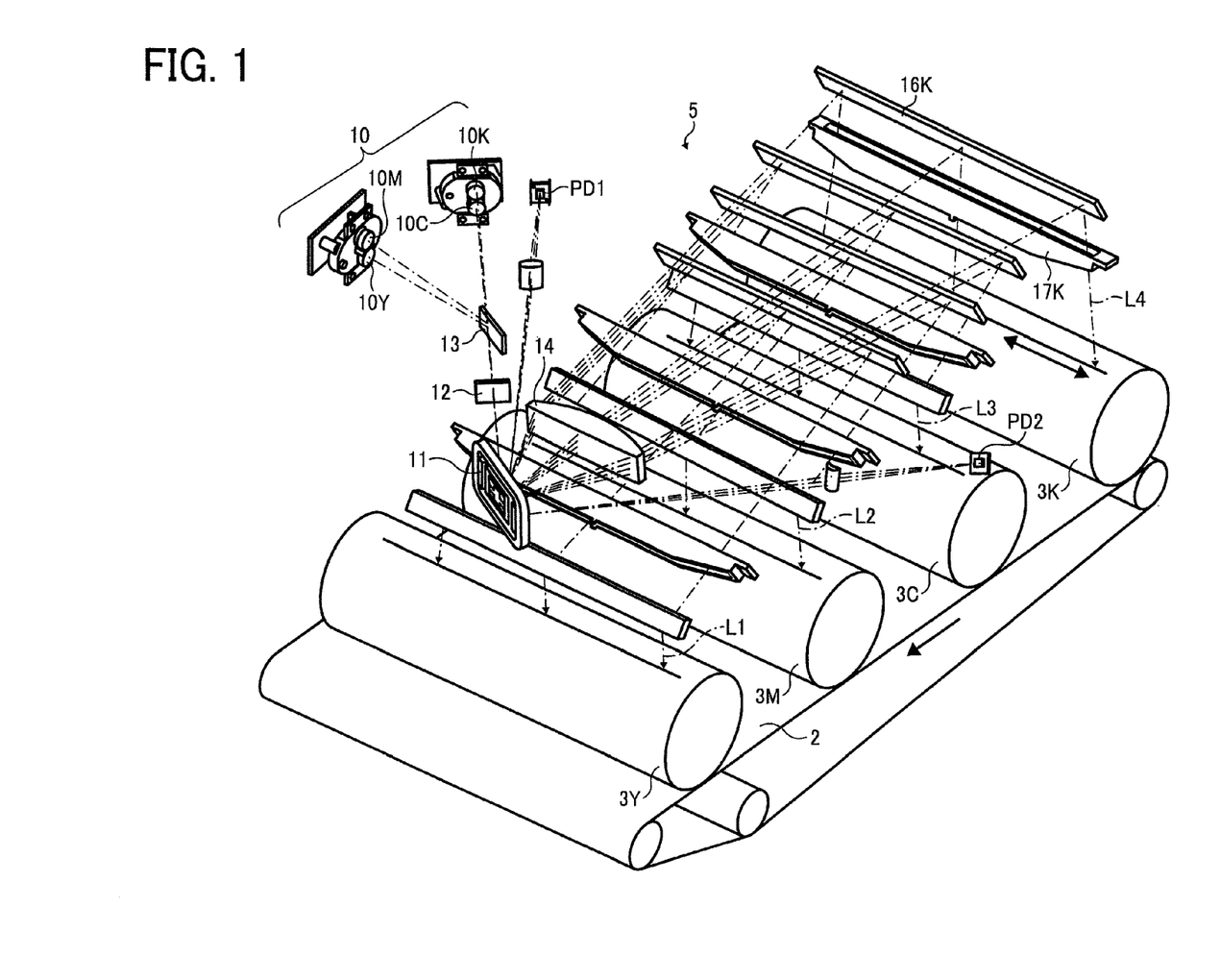
FIG. 1 is a perspective view of an optical scanning device according to a first embodiment of the present invention.

FIG. 1 is a perspective view of an optical scanning device 5 according to a first embodiment of the present invention. The optical scanning device 5 is located above an image forming unit in which four drum-shaped photosensitive elements 3Y, 3M, 3C, and 3K included in an image forming apparatus are arranged in parallel. In the following description, reference numerals accompanied with reference marks Y, M, C, and K correspond to yellow, magenta, cyan, and black, respectively. The optical scanning device 5 includes a light source 10 that includes four light source devices 10Y, 10M, 10C, and 10K that correspond to the four colors. Each of the light source devices 10Y, 10M, 10C, and 10K has a semiconductor laser (not shown) and a coupling lens (not shown). The optical scanning device 5 further includes a vibrating mirror 11 serving as a light deflector that deflects laser beams L1, L2, L3, and L4 for writing yellow, magenta, cyan, and black images emitted by the light source devices 10Y, 10M, 10C, and 10K, and a scanning imaging optical system that individually guides the deflected light beams L1, L2, L3, and L4 to target surfaces of the photosensitive elements 3Y, 3M, 3C, and 3K. The components, such as the light source, the vibrating mirror 11, and the scanning imaging optical system, are contained in an optical housing (not shown).

The four semiconductor lasers included in the light source devices 10Y, 10M, 10C, and 10K emit the light beams L1, L2, L3, and L4 to write images corresponding to the four colors. Each of the light beams L1, L2, L3, and L4 emitted by the semiconductor lasers is converted by the coupling lens into a laser beam having an appropriate form, for example, a parallel beam, a weakly divergent beam, or a convergent beam, for a subsequently arranged optical system. Each of the light beams L1, L2, L3, and L4 is focused in the sub-scanning direction by a cylindrical lens 12 via a half mirror 13 and is formed as a line image elongated in the main-scanning direction near a reflection surface of the vibrating mirror 11.

A laser transmitting member (not shown) is arranged on the incidence side of the vibrating mirror 11, and each of the light beams L1, L2, L3, and L4 emitted by the light source 10 is reflected by the vibrating mirror 11 via the laser transmitting member. The incident light beams L1, L2, L3, and L4 corresponding to the four colors are deflected in the same direction due to vibration generated by the vibrating mirror 11, and the deflected light beams L1, L2, L3, and L4 are transmitted through a first lens 14 included in a group of scanning lenses of the scanning imaging optical system. The light beam L4 is reflected downward by a mirror 16K shown at the upper right of FIG. 1, transmitted through a second lens 17K that is included in the group of the scanning lenses, and focused as an optical spot onto the surface of the photosensitive element 3K. The surface of the photosensitive element 3K is scanned by the optical spot in a direction indicated with an arrow shown in FIG. 1, i.e., the direction parallel to the center axis of the photosensitive element 3K. The first lens 14 and the second lens 17K are made of a plastic material so that an aspherical shape can be formed in an easy manner at low cost. It is preferable that the first lens 14 and the second lens 17K are made of polycarbonate or a polycarbonate-based synthetic resin with a low water absorption rate, a high light transmission rate, and excellent formability.

The surfaces of the photosensitive elements 3Y, 3M, and 3C are scanned by the respective laser beams L1, L2, and L3 using scanning optical systems that each have substantially the same configuration as the scanning optical system for the photosensitive element 3K. Each of the laser beams L1, L2, L3, and L4 is transmitted through the first lens 14, reflected by a mirror arranged for each of the light beams L1, L2, L3, and L4, transmitted through the corresponding second lens, focused as the optical spot onto the surface of the corresponding photosensitive element, and moved on the surface of the photosensitive element in the same direction. An electrostatic latent image of the corresponding color is formed on each of the photosensitive elements 3Y, 3M, 3C, and 3K by the above optical scanning operation. Although optical elements corresponding to yellow, magenta, and cyan are not shown with reference numerals, the optical elements corresponding to yellow, magenta, and cyan are arranged at equivalent positions to the optical elements corresponding to black.

The electrostatic latent image formed on the surface of each of the photosensitive elements 3Y, 3M, 3C, and 3K is developed with toner of the corresponding color by a developing device whereby a toner image is formed on the surface. The toner images corresponding to the four colors are transferred onto an intermediate transfer belt 2 in a superimposed manner so that a color image is formed on the intermediate transfer belt 2. The color image is then transferred onto a sheet-like recording medium and the transferred color image is fixed to the recording medium. After the color image is transferred onto the recording medium, the intermediate transfer belt 2 is cleaned by a cleaning device (not shown).

As described above, the light beams L1, L2, L3, and L4 are emitted by the light source devices 10Y, 10M, 10C, and 10K corresponding to two or more color images, and the emitted light beams L1, L2, L3, and L4 are deflected by the vibrating mirror 11 in the same direction. Each of the deflected light beams L1, L2, L3, and L4 is transmitted through the first lens 14, and then focused onto the corresponding target surface via the second lens arranged for each of the light beams L1, L2, L3, and L4, whereby the optical scanning operation is performed. Thus, the optical scanning device 5 includes four scanning imaging units corresponding to the four colors.

Each of the laser beams L1, L2, L3, and L4 is incident on the reflection surface of the vibrating mirror 11 with an appropriate angle with respect to the sub-scanning direction. This is called an oblique incidence optical system. The maximum incidence angle of a laser beam corresponding to a specific color is set to be less than 5 degrees. If the incidence angle is larger than 5 degrees, a scan line is significantly curved on the scanned surface and the diameter of the laser beam is increased. As a result, the quality of formed images deteriorates. Conversely, if each of the laser beams L1, L2, L3, and L4 is incident on the target surface laterally, i.e., with an oblique incidence angle of 0 degrees, rather than obliquely, the reflection surface of the vibrating mirror 11 needs to have a wide width in the sub-scanning direction. As a result, a large load is required to drive the vibrating mirror 11, and it is difficult to obtain a high vibrational frequency.

The scanning lens is bonded to a predetermined bonding area of the optical housing. It is preferable that the scanning lens is bonded to the optical housing at only a middle portion of the scanning lens in the main-scanning direction. When the scanning lens is deformed due to heat expansion, it expands from the middle portion toward both ends of the scanning lens in the longitudinal direction. Therefore, the scanning lens can freely expand depending on the temperature without deforming in an abnormal manner in the main-scanning direction; therefore it is possible to prevent significant local degradation of a magnification error in the main-scanning direction. Because the scanning lens is bonded to the optical housing, it is possible to reduce the number of components, simplify the process of fixing the scanning lens, and reduce manufacturing costs.

Figure 2:
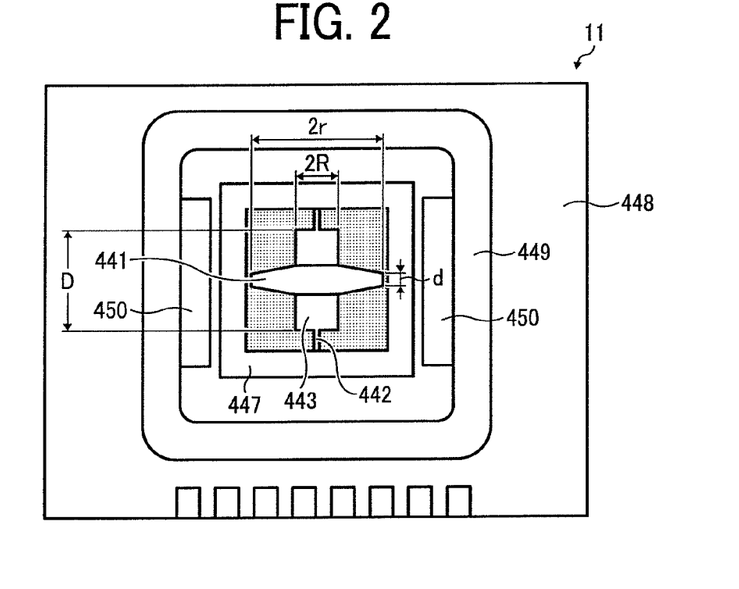
FIG. 2 is a front view of a vibrating mirror shown in FIG. 1.
Figure 3A:
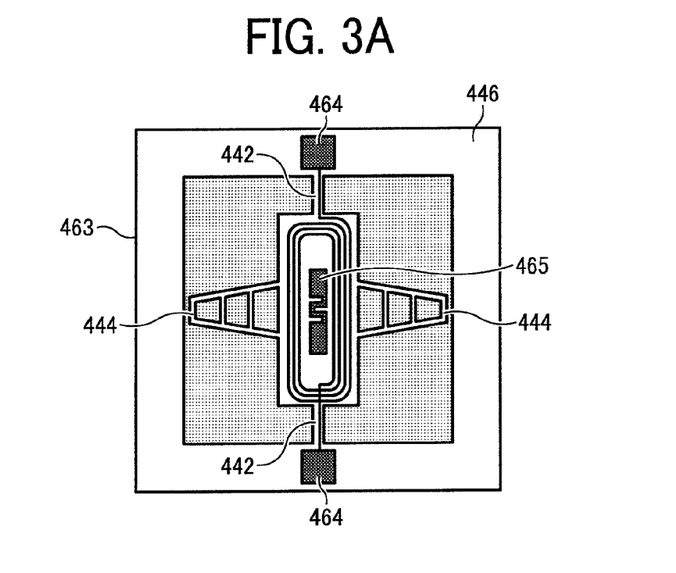
FIG. 3A is a back view of an enlarged major part of the vibrating mirror.
Figure 3B:
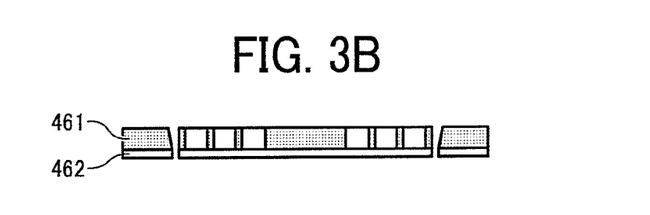
FIG. 3B is a side view of the enlarged major part.
Figure 4:
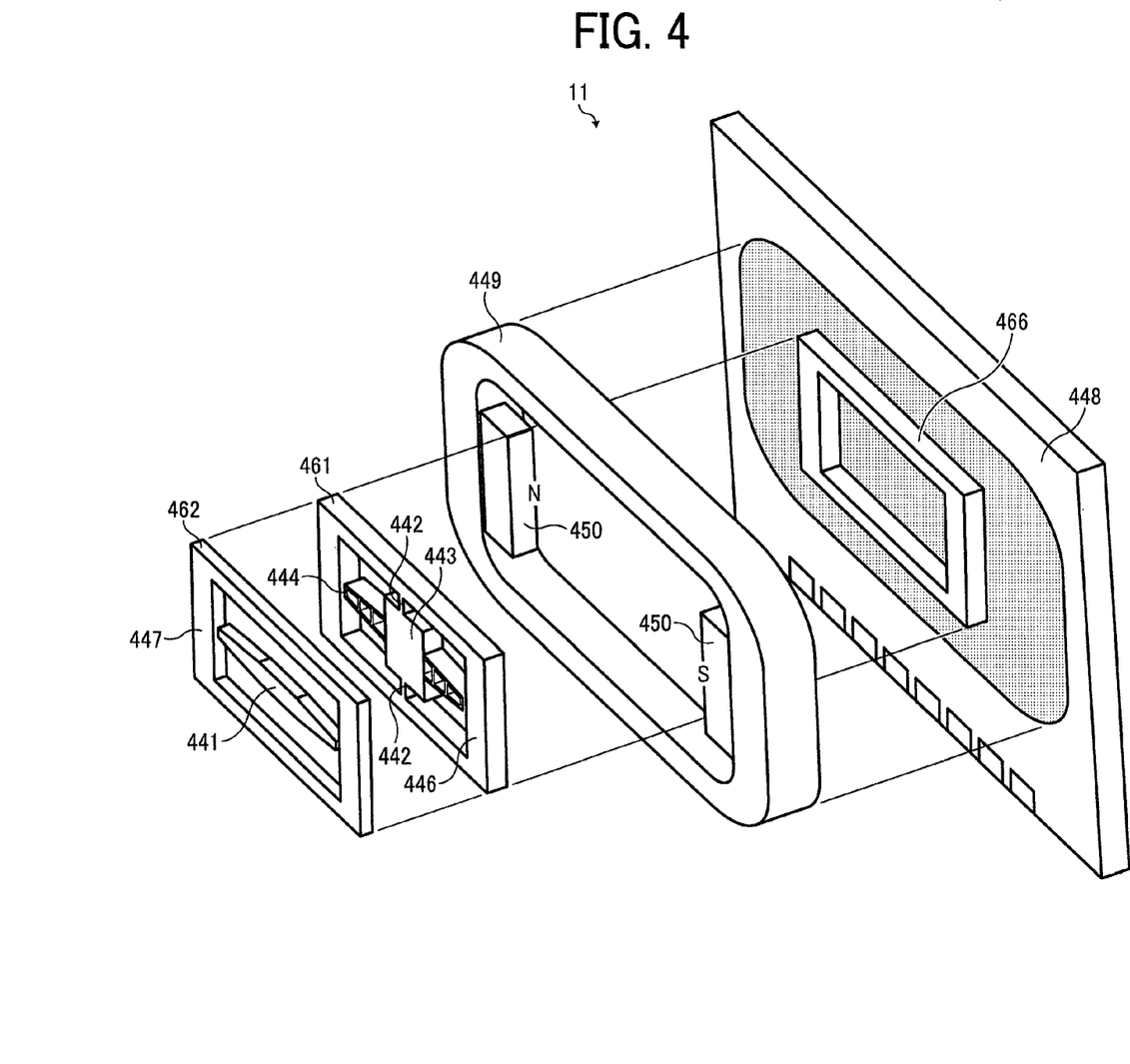
FIG. 4 is an exploded perspective view of the vibrating mirror.

FIG. 2 is a front view of the vibrating mirror 11 including a drive section. FIG. 3A is a back view of an enlarged major part of the vibrating mirror 11, and FIG. 3B is a side view of the enlarged major part. FIG. 4 is an exploded perspective view of the vibrating mirror 11. The vibrating mirror 11 includes a movable section serving as a vibrator that has a mirror surface formed on its front side, a twisted beam 442 serving as a rotary shaft that rotatably supports the movable section, and a frame serving as a supporting member. The vibrating mirror 11 is formed by etching a silicon (Si) substrate.

The vibrating mirror 11 is manufactured from a wafer formed by previously bonding a first substrate 462, a second substrate 461, both called Silicon on Insulator (SOI) substrates, and an oxide film interposed between the first substrate 462 and the second substrate 461. The surface of the second substrate 461 has a thickness of 140 μm and is subjected to a dry plasma etching process in order to form the following on the second substrate 461: the twisted beam 442; a vibrating plate 443 on which a planar coil is formed; a reinforcing beam 444 serving as a framework of the movable section; and a frame 446. During the same dry plasma etching process, part of the second substrate 461 other than the twisted beam 442, the vibrating plate 443, the reinforcing beam 444, and the frame 446 is removed whereby the oxide film is exposed. The surface of the first substrate 462 has a thickness of 60 μm and is subjected to anisotropic etching using potassium hydroxide (KOH), or the like, so that a movable mirror 441 and a frame 447 are formed on the first substrate 462. During the same anisotropic etching process, part of the first substrate 462 other than the movable mirror 441 and the frame 447 is removed whereby the oxide film is exposed. Then, the oxide film formed around the movable section is removed so that the structure of the vibrating mirror 11 is formed. The twisted beam 442 and the reinforcing beam 444 have a width in a range of 40 μm to 60 μm. As described above, it is preferable that inertia moment I of the vibrator is small in order to obtain a large deflection angle. Because the mirror surface is deformed due to inertia forces, an area other than the movable section is removed from the substrate. An aluminum thin film is deposited on the front surface of the first substrate 462, whereby a reflection surface is formed, and a copper thin film is formed on the front surface of the second substrate 461, whereby a coil pattern 463, terminals 464 connected via the twisted beam 442, and a patch 465 used for trimming are formed. It is possible to attach a thin-film permanent magnet to the vibrating plate 443 and to form a planar coil on the frame 447.

The vibrating mirror 11 is assembled on a mounting board 448 that forms a base. A frame-like base 466 on which the vibrating mirror 11 is mounted and a yoke 449 formed like a frame surrounding the vibrating mirror 11 are arranged on the mounting board 448. A pair of permanent magnets 450 that generate a magnetic field in a direction perpendicular to the rotation axis of the movable mirror 441 is attached to the inside of the yoke 449 such that the north pole and the south pole are facing the respective ends of the movable mirror 441.

The vibrating mirror 11 is mounted on the base 466 such that the mirror surface is facing toward the front side. When an electric current flows between the terminals 464, a Lorentz force is generated on each side of the coil pattern 463 arranged in parallel to the rotation axis, whereby a rotary torque T is generated. The twisted beam 442 is twisted due to the rotary torque T so that the movable mirror 441 is rotated. When the electric current is turned off, the movable mirror 441 is returned to its lateral position due to the force of the twisted beam 442.

The direction of the electric current flowing through the coil pattern 463 is alternatively switched (an alternating-current (AC) drive signal is applied to the coil pattern 463) so that the movable mirror 441 can vibrate. If the cycle at which the direction of the electric current is alternatively switched corresponds to a natural frequency, i.e., a resonance frequency f0, of the structure of the vibrating mirror 11 at a first-order vibration mode with the twisted beam 442 as the rotation axis, vibration amplitude is excited whereby a large deflection angle can be obtained.

Conversely, an electric current containing a direct-current (DC) component is applied to the coil pattern 463 (a DC voltage is applied to the coil pattern 463), so that the movable mirror 441 can be statically altered (the center of the vibration amplitude can be altered). Because the resonance phenomenon is used, an angle is altered within ±1 degree depending on the electric current. The DC component is superimposed on the AC signal, so that it is possible to alter the center of the vibration amplitude while the vibrating mirror 11 is vibrated, i.e., deflected.

Figure 5:
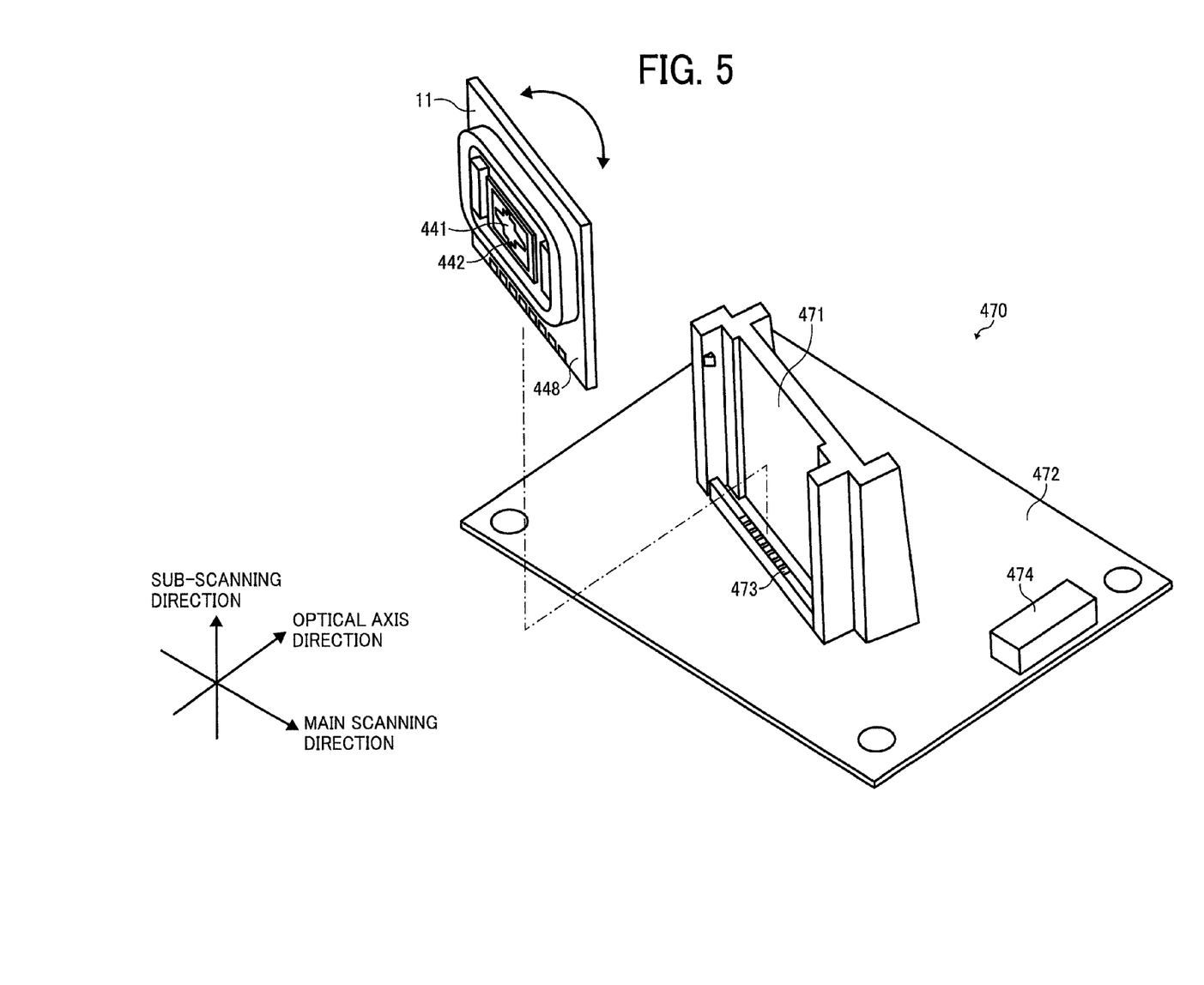
FIG. 5 is an exploded perspective view of a vibrating mirror unit for mounting the vibrating mirror on an optical housing.

FIG. 5 is an exploded perspective view of a vibrating mirror unit 470 for mounting the vibrating mirror 11 in the optical housing. The vibrating mirror unit 470 includes the vibrating mirror 11, a board 472 that is to be mounted in the optical housing, a bracket 471 mounted on the board 472 to fix the position of the vibrating mirror 11 and make an electric connection with the vibrating mirror 11 with an electrode 473, and an electric connector 474 attached to the board 472. The board 472 is mounted in the optical housing so that the vibrating mirror 11 is attached to the optical housing.

Because the mass of the movable section is low and the inertia force of the movable section is much smaller than that of polygon mirrors widely used in conventional technology, the size of the drive section is reduced and the efficiency of a magnetic circuit (not shown) is improved, whereby electric power consumption can be reduced. The electric power consumption of the vibrating mirror 11 is less than one-tenth of that of a polygon mirror. As a result, heat generation is reduced and it is therefore possible to prevent an increase in temperature of the optical elements included in the scanning optical system and the housing. Especially, because the scanning lens made of resin does not have locally distributed temperature, it is possible to reduce variation in a scan position of the laser beam during a color-image forming operation and thereby prevent the occurrence of color shift.

Furthermore, because of the low mass and the small inertia force of the movable section, the vibration (i.e., the vibration due to mass imbalance of the vibrating mirror 11) transmitted to the outside when the vibrating mirror 11 is vibrated is extremely small. It is specifically less than one hundredth of that of the polygon mirror. Therefore, because the vibration is not substantially transmitted to a scanning optical element from the scanning optical system serving as a vibrating source, it is possible to prevent banding due to the vibration of the mirror arranged in the optical scanning system during an image forming operation.

Figure 6:
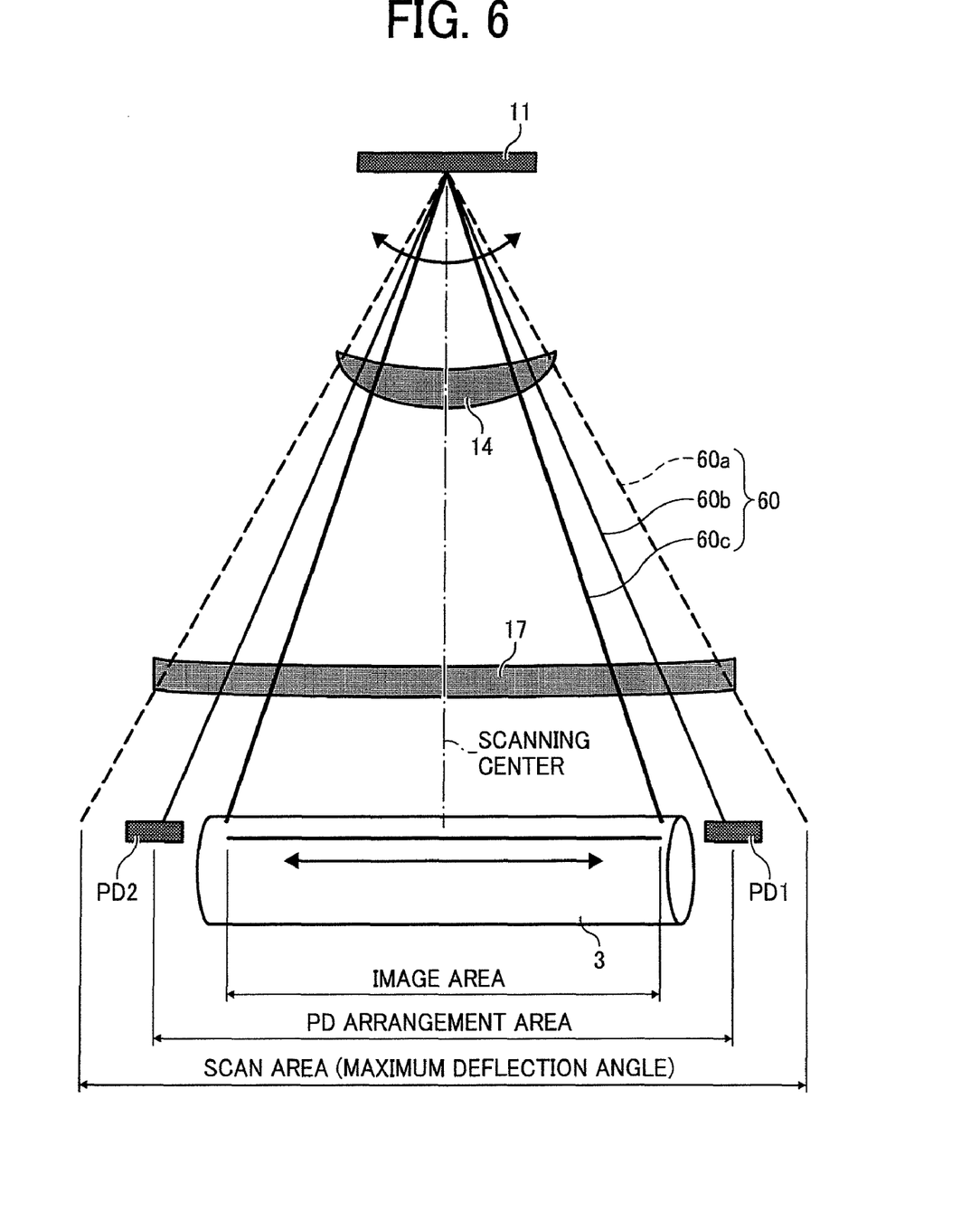
FIG. 6 is a schematic diagram of a photosensitive element shown in FIG. 1 and corresponding major components.

To take advantage of the vibrating mirror 11 having the above configuration, it is necessary to perform an appropriate operation for controlling the vibrating mirror 11. FIG. 6 is a schematic diagram of a photosensitive element 3 included in the optical scanning device 5 and corresponding major components. A scan area of a laser beam 60 deflected by the vibrating mirror 11 is divided into three scan positions: scan positions 60a at the maximum deflection angle; scan positions 60b at which the laser beam 60 enters light receiving elements PD1 and PD2 arranged within the maximum deflection angle, whereby a detection signal is output; and scan positions 60c at which outer ends of an image area of the photosensitive element 3 are scanned with the laser beam 60.

Figure 7:
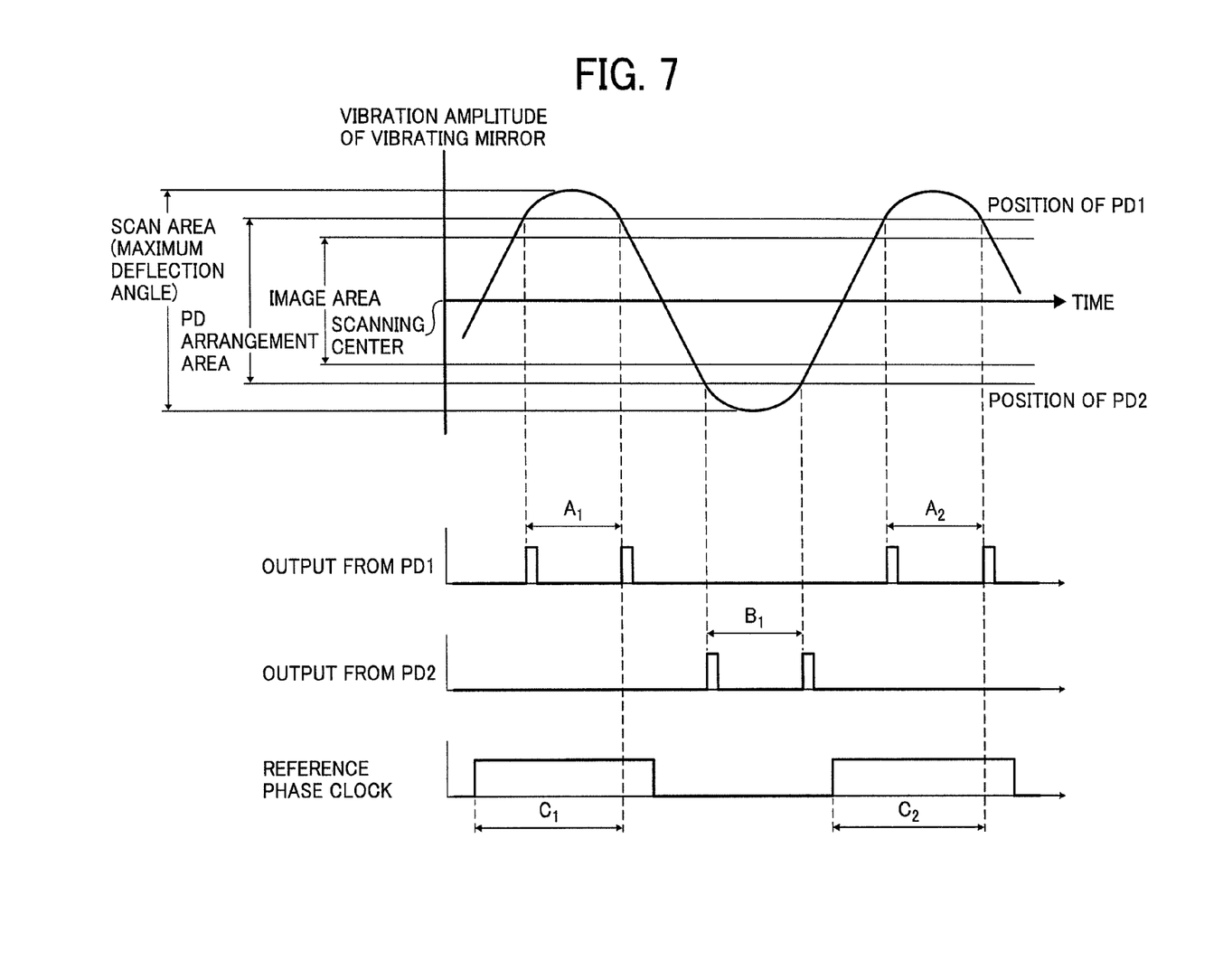
FIG. 7 is a timing chart for explaining vibration amplitude of the vibrating mirror, outputs from light receiving elements shown in FIG. 1, and outputs from a reference phase clock.

FIG. 7 is a timing chart for explaining the vibration amplitude of the vibrating mirror 11 with respect to the time axis, outputs from the light receiving elements PD1 and PD2, and outputs from a reference phase clock for generating a signal to drive the vibrating mirror 11. Because the vibrating mirror 11 generates large vibration amplitude by using the resonance phenomenon, the vibration amplitude of the vibrating mirror 11 forms a trajectory in a sinusoidal waveform with respect to time, and the scanning speed of the deflected laser beam is different at each scan position. To obtain a constant scanning speed of the laser beam on the target surface even though the scanning speed of the laser beam deflected by the vibrating mirror 11 is not constant, the first lens 14 and a second lens 17 have f·arcsin characteristics.

Figure 9:
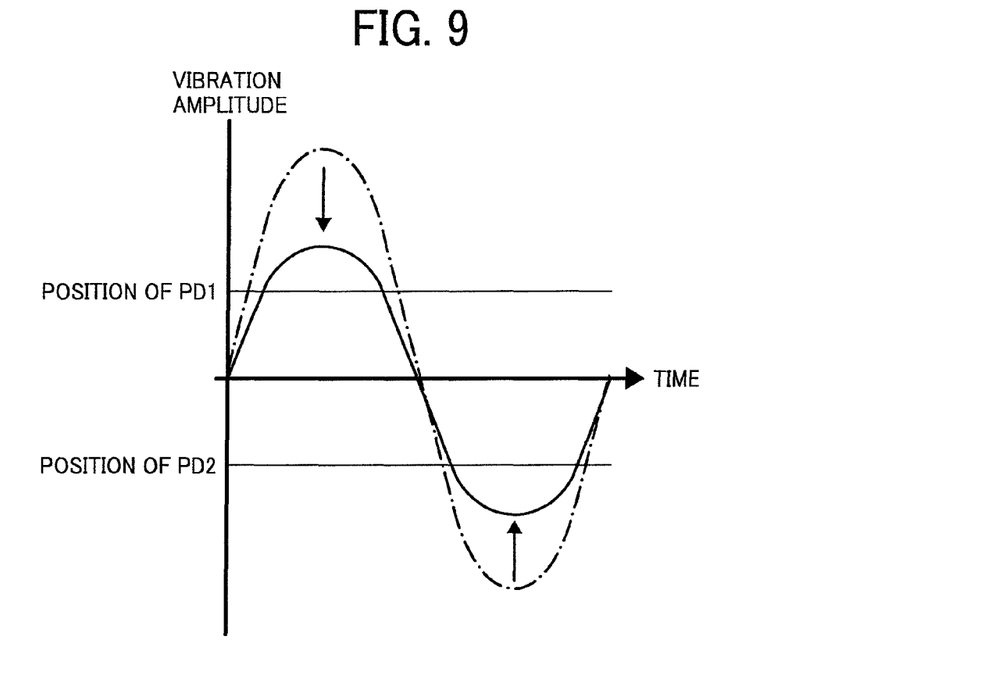
FIG. 9 is a waveform chart for explaining an example of a vibration-amplitude control operation performed on the vibrating mirror.
Figure 10A:
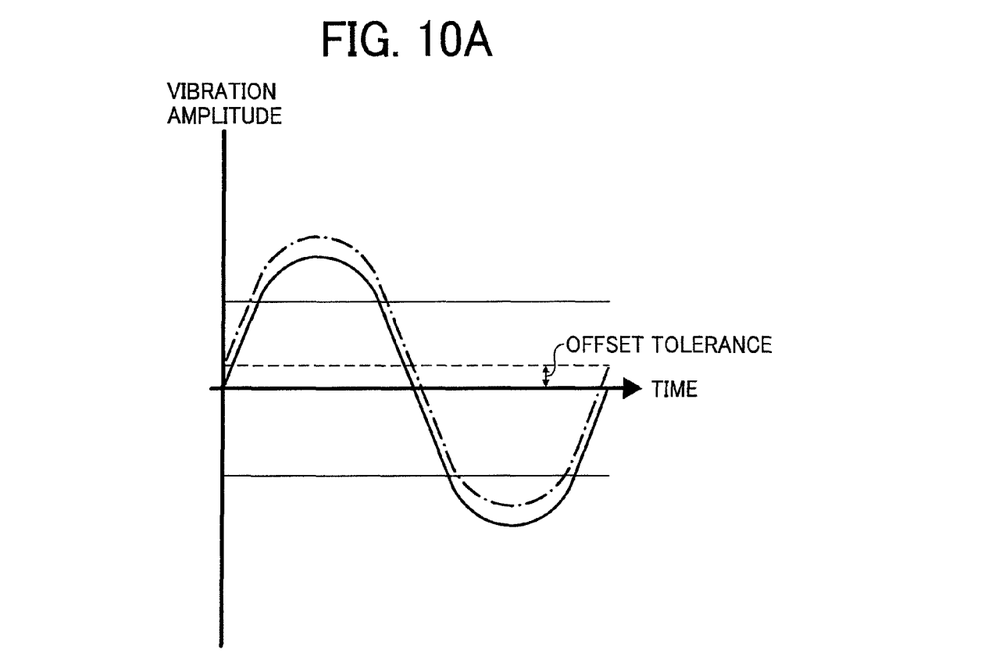
FIGS. 10A and 10B are waveform charts for explaining an example of an offset control operation performed on the vibrating mirror.
Figure 10B:
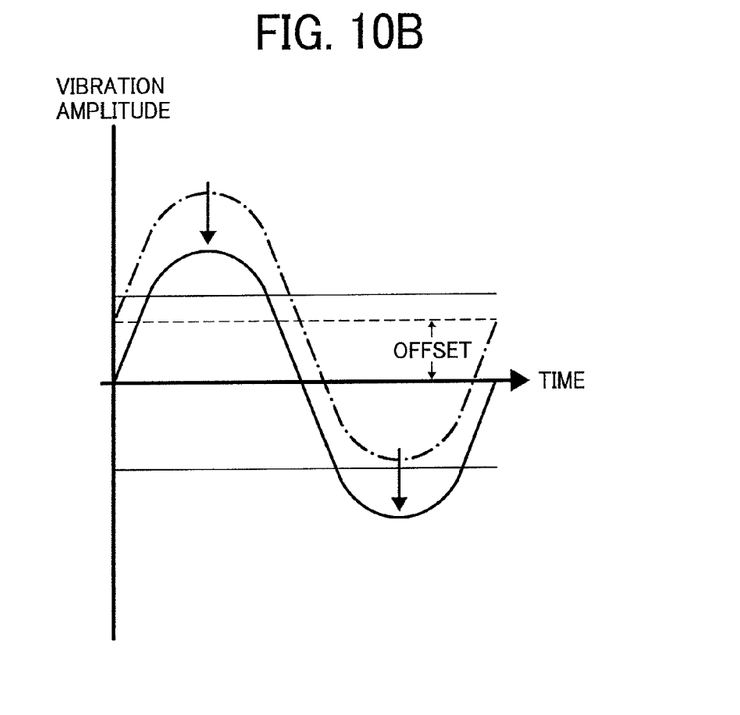
Figure 11:
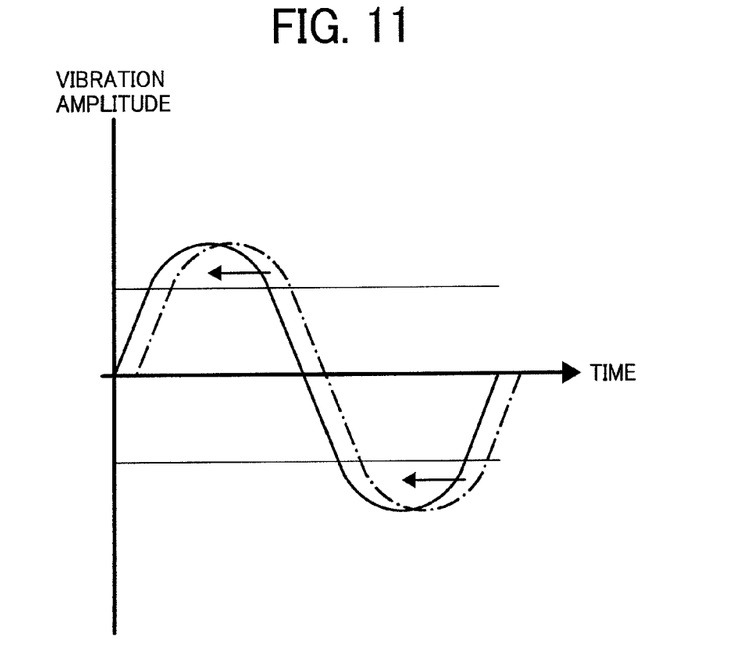
FIG. 11 is a waveform chart for explaining an example of a phase control operation performed on the vibrating mirror.

FIG. 9 is a waveform chart for explaining an example of a vibration-amplitude control operation performed on the vibrating mirror 11. FIGS. 10A and 10B are waveform charts for explaining an example of an offset control operation performed on the vibrating mirror 11 and show a positional relation between the center of the vibration amplitude of the vibrating mirror 11 and the optical scanning center. FIG. 11 is a waveform chart for explaining an example of a phase control operation performed on the vibrating mirror 11 and shows phase fluctuation of the waveform of the vibration amplitude of the vibrating mirror 11. Even if the scanning lens that has the f·arcsin characteristics is used, variation occurs in the vibration of the vibrating mirror 11 as shown in FIGS. 9 to 11. Therefore, each of the control operations is performed to prevent the variation in the vibration. Even though the vibrational frequency of the vibrating mirror 11 is constant, the scan position of the laser beam varies like waveforms indicated with dot-dash-lines shown in FIGS. 9 to 11 with respect to ideal waveforms indicated with solid lines shown in FIGS. 9 to 11, and therefore the quality of images formed with the laser beam deteriorates.

As shown in FIG. 9, if the vibration amplitude is larger or smaller than a target value, the vibration amplitude is adjusted in directions indicated with arrows shown in FIG. 9 so that the vibration amplitude becomes the target value. The waveform of the vibration amplitude of the vibrating mirror 11 is shown in the upper section of FIG. 7. The waveform of the vibration amplitude can be divided into three areas: an entire scan area, that is, a maximum deflection-angle area corresponding to the scan positions 60a; a light-receiving elements (PD) arrangement area corresponding to the scan positions 60b; and an image area corresponding to the scan positions 60c. The light receiving elements PD1 and PD2 are located at both ends of the scan area. The light receiving elements PD1 and PD2 detect the light beam during the optical scanning operation in a first direction. Afterward, the light beam reaches the maximum deflection angle. The light receiving elements PD1 and PD2 then detect the light beam again during the optical scanning operation in a second direction opposite to the first direction. During the detection operation, a time interval between the rising edge of a first detection output from the light receiving element PD1 during a first cycle and the rising edge of a second detection output from the light receiving element PD1 during the first cycle is referred to as a time interval $A_1$, and a time interval between the rising edge of a first detection output from the light receiving element PD2 during the first cycle and the rising edge of a second detection output from the light receiving element PD2 during the first cycle is referred to as a time interval $B_1$. Furthermore, a time interval between the rising edge of a first detection output from the light receiving element PD1 during a second cycle and the rising edge of a second detection output from the light receiving element PD1 during the second cycle is referred to as a time interval $A_2$.

The waveform of the vibration amplitude shown in FIG. 7 is an ideal waveform, and calculated values of the time interval A between outputs from the light receiving element PD1 and the time interval B between outputs from the light receiving element PD2 are constant. Therefore, the vibrating mirror 11 is controlled such that the time intervals A and B are generated as shown in FIG. 7. Specifically, an averaging operation is performed a plurality of times such that $(A_1+B_1)/2, (A_2+B_2)/2, \ldots$, and a control operation is performed so that an averaged value becomes a control target value uniquely determined from the resonance frequency.

As shown in FIGS. 10A and 10B, offset occurs in the waveform of the vibration amplitude with respect to the optical scanning center, i.e., the center of the vibration amplitude of the vibrating mirror 11 shifts from the optical scanning center. As shown in FIG. 10A, the offset falls within an allowable level. Although the offset affects linearity and beam diameter that are optical scanning characteristics, the offset does not always need to be zero in consideration of influence on images. Specifically, a linearity error is corrected by controlling the lighting timing of the laser beam based on image data, whereby the influence of the linearity error is prevented. Moreover, to prevent the influence of the beam diameter, light intensity (integrated light intensity) is controlled so that an equivalent electrostatic latent image is formed on the photosensitive element, whereby the influence of the offset is reduced.

It is possible that the above control operation is not performed if the offset falls within an offset tolerance. For example, the offset tolerance is set such that deviation of the linearity from a design value is less than 1% and deviation of the beam diameter from a design value is less than 10% so that influence on images is prevented without performing the above control operation.

As shown in FIG. 10B, if the offset of more than the offset tolerance occurs in the waveform of the vibration amplitude of the vibrating mirror 11, it is necessary to adjust (correct) the offset such that the offset falls within the offset tolerance. The offset is adjusted by superimposing a DC component on the drive voltage containing an AC component to be applied to the vibrating mirror 11 depending on the offset. The position of the vibrating mirror 11 is altered in the main-scanning direction and the center of the vibration amplitude is adjusted such that the offset falls within the offset tolerance. Alternatively, the offset can be adjusted by altering the position of the vibrating mirror 11 by using a drive mechanism of the vibrating mirror 11. The drive mechanism can be configured by arranging a stepping motor (not shown) on the lower surface of the board 472 such that the rotation axis of the stepping motor corresponds to the vibration axis of the vibrating mirror 11. The vibrating mirror unit 470 is rotated around the vibration axis to alter the position of the vibrating mirror 11 so that the offset falls within the offset tolerance. Rotational resolution of the stepping motor needs to correspond to at least less than one-half of the offset tolerance.

The offset adjustment is performed in conventional technology such that the offset becomes zero rather than becoming within the offset tolerance as described above. A superimposition circuit (not shown) that superimposes the DC component required for such offset adjustment needs to output a voltage to adjust the offset such that the offset shown in FIG. 10B becomes zero. In order to obtain a capability to satisfy the above need, a control circuit (not shown) becomes large and a large amount of heat is generated, whereby the temperature within the optical scanning device 5 is increased. As a result, optical scanning characteristics are degraded. Furthermore, the costs are increased in accordance with the increased size of the circuit.

It is difficult to drive without limit an electric current (voltage) during the offset adjustment depending on the offset because of the upper limit on the current rating of the vibrating mirror 11. If the current exceeds the current rating, a circuit element (not shown) can be damaged. Especially, in the case of the electromagnetically driven vibrating mirror 11 shown in FIGS. 2 to 5, because the electric power consumption of the DC component corresponds to the electric power consumption of the coil (copper loss), the increasing amount of the offset to be adjusted causes an increase in heat generation, which results in an increase in temperature.

Figure 8:
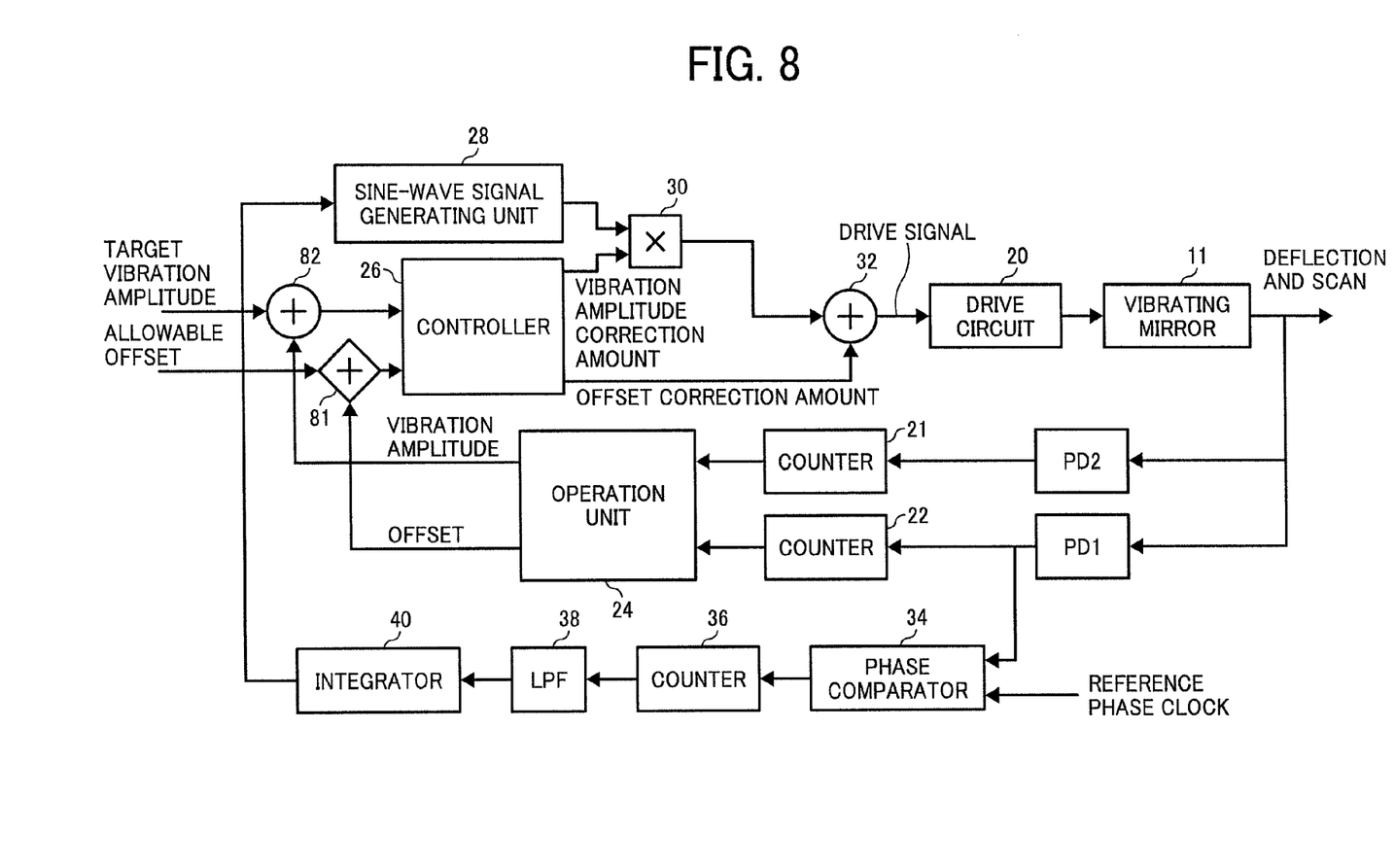
FIG. 8 is a block diagram of a drive control circuit for the vibrating mirror.

FIG. 8 is a block diagram of a drive control circuit for the vibrating mirror 11. As shown in FIG. 10B, if large offset occurs in the vibrating mirror 11 like the waveform of the vibration amplitude indicated with the dot-dash-line, the offset is adjusted to fall within the offset tolerance as indicated with arrows shown in FIG. 10B. To adjust the offset, the driving of the vibrating mirror 11 is controlled such that the calculated values of the time interval A between the outputs from the light receiving element PD1 and the time interval B between the outputs from the light receiving element PD2 are constant, as shown in FIG. 7. Specifically, the offset is detected a plurality of times such that $A_1-B_1, A_2-B_2, \ldots$, and an averaging operation is performed on the detected offset. Then, a comparator 81 included in the drive control circuit determines whether the averaged value falls within the offset tolerance, and if it is within the offset tolerance, the offset control operation is not performed, and if it exceeds the offset tolerance, the offset control operation is performed.

As shown in FIG. 11, the waveform of the actual vibration amplitude indicated with a dot-dash-line shifts on the time axis with respect to the waveform of ideal vibration amplitude indicated with a solid line. If the phase fluctuation occurs as shown in FIG. 11, the phase control operation is performed such that the phase of a time interval C between the reference phase clock and the output from the light receiving element PD1 is constant, as shown in FIG. 7, so that the waveform of the actual vibration amplitude shifts in a direction indicated with arrows shown in FIG. 11, whereby the phase of the waveform of the actual vibration amplitude corresponds to the phase of the waveform of the ideal vibration amplitude. Specifically, the time interval C is detected a plurality of times, an averaging operation is performed on the time intervals $C_1, C_2, \ldots$, and a control operation is performed so that the averaged value becomes zero as a target value. It is preferable that the output of the light receiving element PD1 for counting the time interval is fed at a timing just before the image forming area (on the rear end side of the time interval A). It is preferable that the phase is adjusted just before an image writing operation (on the rear end side of the time interval A). This is because the phase can be adjusted with high accuracy. If the phase is adjusted on the front end side of the time interval A, because the adjusted phase fluctuates within the time interval A, the accuracy of the phase during an image forming operation is decreased.

As shown in FIGS. 9 and 10B, if the vibration amplitude or the offset exceeds the tolerance, the scanning speed is not the ideal scanning speed, and therefore the scan position shifts in the main-scanning direction. For example, there occurs image deterioration such as jitter (fluctuations of perpendicular lines) in the main-scanning direction or a magnification error of the main scanning. These problems can occur in monochromatic images as well as color images.

The fluctuation of the phase as shown in FIG. 11 is a problem peculiar to a color image forming operation. As described with reference to FIG. 1, the single vibrating mirror 11 deflects the laser beams L1, L2, L3, and L4 emitted by the light source devices 10Y, 10M, 10C, and 10K corresponding to the four colors based on image signals, and the photosensitive elements 3Y, 3M, 3C, and 3K are scanned with the light beam L1, L2, L3, and L4. However, if phase fluctuation occurs, the scan position of the deflected light beam corresponding to each of the colors is altered. Therefore, the position of an image formed on the intermediate transfer belt 2 is shifted in the sub-scanning direction, which results in color shift or color shading.

As shown in FIG. 8, counters 21 and 22 included in the drive control circuit measure signals output from the light receiving elements PD1 and PD2 when the deflected laser beam enters the light receiving elements PD1 and PD2. Amplitudes of the outputs from the light receiving elements PD1 and PD2 are referred to as amplitudes A and B. An operation unit 24 included in the drive control circuit calculates an average of the sum of the amplitudes A and B, i.e., (A+B)/2, and a comparator 82 included in the drive control circuit compares the calculation result with target amplitude. In a similar manner, the operation unit 24 calculates an average of difference between the amplitudes A and B, i.e., A-B, and the comparator 82 determines whether the calculation result falls within the offset tolerance by comparison. The operation unit 24 performs the above calculations, so that the operation unit 24 functions as an offset detecting unit. If the determination result indicates that the calculation result falls within the offset tolerance, the result is output to a controller 26 included in the drive control circuit without performing a correcting operation, and if the calculation result does not fall within the offset tolerance, the controller 26 adjusts the difference between the calculation result and the offset tolerance. Therefore, after the adjustment, a residual adjustment error is reduced to within the offset tolerance even if the offset is not zero. The reason why the averaging operation is performed is to prevent the control operation from being performed based on incorrect information, for example, in the case of accidental contamination by an electrical noise. The number of times the averaging operation is performed is in the range of 2 to 10. This is because, if the averaging operation is performed more than 10 times, the correction timing is delayed, and therefore system deviation is increased.

The controller 26 calculates a correction amount of the vibration amplitude and the offset in accordance with the comparison result, and a drive circuit (amplifier) 20 included in the vibrating mirror 11 amplifies a corrected drive signal of a sine wave, thereby controlling the vibrating mirror 11 based on the amplified signal. The above control system loop is a control loop for the vibration amplitude and the offset. The offset control operation is performed after the vibration-amplitude control operation is performed. Thus, the controller 26 functions as an adjusting unit that adjusts the center of the vibration amplitude of the vibrating mirror 11.

After the vibration-amplitude control operation and the offset control operation are properly performed whereby each of the vibration amplitude and the offset falls within a desired range of a target value, the phase control loop is performed such that the phase of the drive signal of the vibrating mirror 11 and the phase of the deflection angle of the vibrating mirror 11 are constant.

Because the phase control operation requires higher accuracy than the vibration-amplitude control operation and the offset control operation, if all of the operations are simultaneously performed, the drive signal is largely varied due to interference between the operations, and it takes a long time to set the vibration amplitude, the offset, and the phase within a range of a control target value. Therefore, the vibration-amplitude control operation is performed as the first priority, and then the offset control operation is performed. Afterward, the phase control operation is performed for fine adjustment. Thus, the time required for setting the vibration amplitude, the offset, and the phase within the range of the control target value can be shortened.

A deviation between the phase of the signal output from the light receiving element PD1 and the phase of the reference phase clock is detected by a phase comparator 34 included in the drive control circuit (see $C_1$ and $C_2$ in FIG. 7) and measured by a counter 36 included in the drive control circuit. A measurement result is fed to a low pass filter (LPF) 38 included in the drive control circuit and integrated by an integrator 40 included in the drive control circuit in order to be converted into a DC signal at a voltage depending on the phase deviation, and then the phase is altered depending on the voltage. This is a phase locked loop (PLL) control. In response to the alteration in the phase, a sine-wave signal generating unit 28 included in the drive control circuit generates a sine-wave signal having an appropriate phase depending on a prepared phase alteration amount (resolution). Thus, the control operation is performed such that the phase of the drive signal of the vibrating mirror 11 and the phase of the deflection angle of the vibrating mirror 11 are constant.

Although the resolution for generating the sine-wave signal for the phase control operation requires a higher accuracy compared to the tolerance range of the phase control operation, because a memory is necessary if the higher accuracy is required, the costs are increased. Therefore, the resolution for generating the sine-wave signal is set to be lower than 50 μm, which is visually recognized as color shift in the sub-scanning direction.

Figure 12:
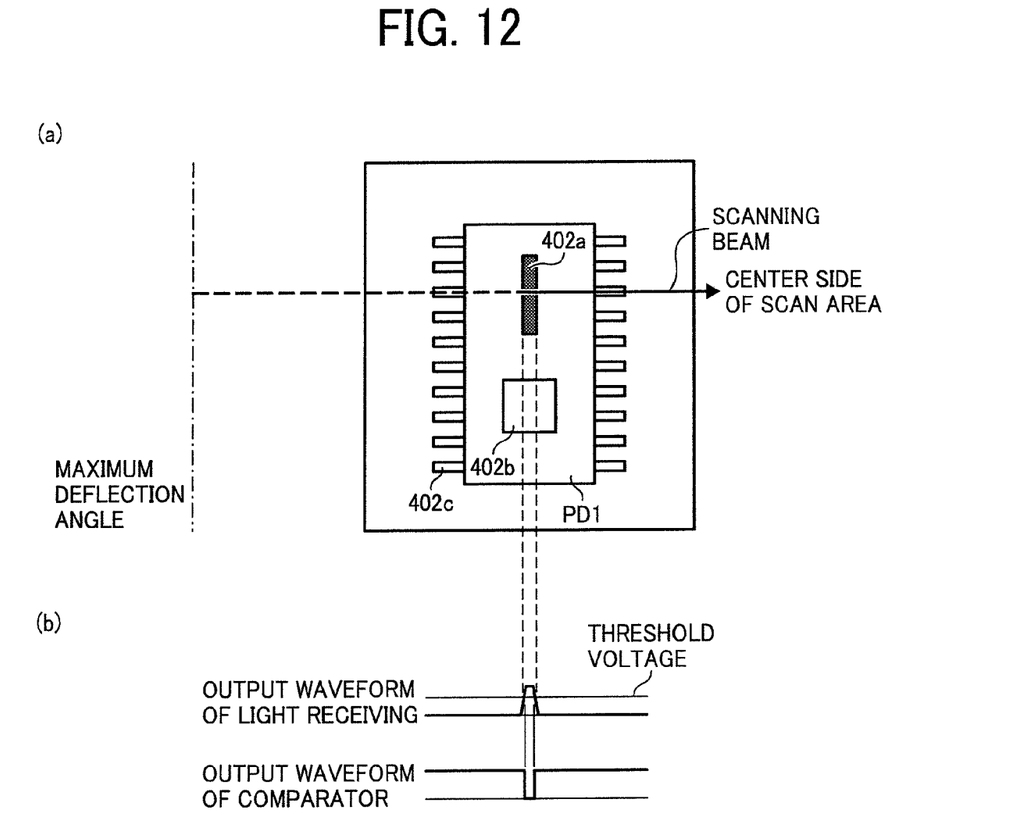
FIG. 12 is a schematic diagram for explaining relation between the light receiving element and the laser beam with which the light receiving element is scanned, with a waveform chart of outputs from the light receiving element and a comparator shown in FIG. 8.

FIG. 12(a) is a schematic diagram for explaining the relation between the light receiving element PD1 and the laser beam with which the light receiving element PD1 is scanned. FIG. 12(b) is a waveform chart of outputs from the light receiving element PD1 and the comparator. As shown in FIG. 1, the light receiving element PD1 is arranged at a position so as to obtain a laser beam optically equivalent to a laser beam by which the surface of the photosensitive element is scanned. The phrase "optically equivalent" means that the beam diameter and the scanning speed are substantially the same. Although it is preferable that the light receiving element PD1 is arranged on a line extending from an area of the optical scanning for the surface of the photosensitive element, it is possible that the light receiving element is scanned with the laser beam via a mirror because of the layout. The light receiving element PD1 includes a receiving unit 402a including a PIN photodiode, an amplifier circuit that amplifies the signal output from the receiving unit 402a, and a comparator circuit that shapes the waveform of the amplified signal. The light receiving element PD1 is formed into a package by a laser-beam transmitting member made of resin and integrated as an integrated circuit (IC). A circuit unit is indicated with a reference numeral 402b, and a lead of the IC is indicated with a reference numeral 402c. When the scanning beam passes through the receiving unit 402a, a signal output from the comparator is generated as shown in (b) of FIG. 12.

Over an area scanned by the scanning beam indicated with a dashed line shown in (a) of FIG. 12, the light source is turned off, or because a flare light is present in a light receiving element, the light beam emitted by the light source is reduced such that the light intensity of the light beam is not enough to form a latent image on the surface of the photosensitive element. If the light source is turned on within an area between the maximum deflection angle of the vibrating mirror 11 and "a position near the light receiving element", a ghost light occurs due to diffuse reflection caused by an optical element arranged in the optical scanning device, which causes a noise in signals output from the light receiving elements PD1 and PD2. As a result, the time intervals A, B, and C shown in FIG. 7 are distorted, an improper control operation is performed, or a control operation is performed in an unstable manner. To prevent such problems, the settings are specified in advance such that the light source is turned off at a predetermined timing or the light beam emitted by the light source is reduced such that the ghost light is prevented from having enough light intensity to form the latent image on the surface of the photosensitive element. Turning off the light source or reducing the intensity of the light beam can make it possible to achieve a longer operation life of the light source including the semiconductor laser and reduce the increase in temperature of the light source. "The position near the light receiving element" corresponds to the scan position with an emission timing such that each of the time intervals A, B, and C can be properly measured without affecting the output from the comparator.

If the light intensity is reduced due to a decrease (time degradation) in reflectance and transmittance of the optical element, the risetime of a voltage to reach a threshold voltage that determines the output from the comparator becomes longer (inclination with respect to the time axis becomes more gradual), which results in incorrect detection. Therefore, the light source is controlled such that the light intensity is always constant during scanning of the light receiving element, so that the above problem is resolved.

Although a sine wave is used as an example of the drive signal, a large number of bits in a digital/analog (D/A) converter is required to generate the sine wave and a large capacity memory is required. Therefore, a square wave that can be generated by a crystal oscillator at low costs can be used.

Furthermore, although it is explained in the embodiment that the scanning operation is performed in the first direction and the second direction due to the vibration of the vibrating mirror 11, because the scan position in the sub-scanning direction is located to be close to the edge of the maximum deflection angle during the above scanning operation, i.e., the scanning operation is performed in a zig-zag manner, damage occurs to images on both sides of an image or density unevenness occurs. Such a problem can be resolved by performing the scanning operation on one side (in one direction).

Figure 13:
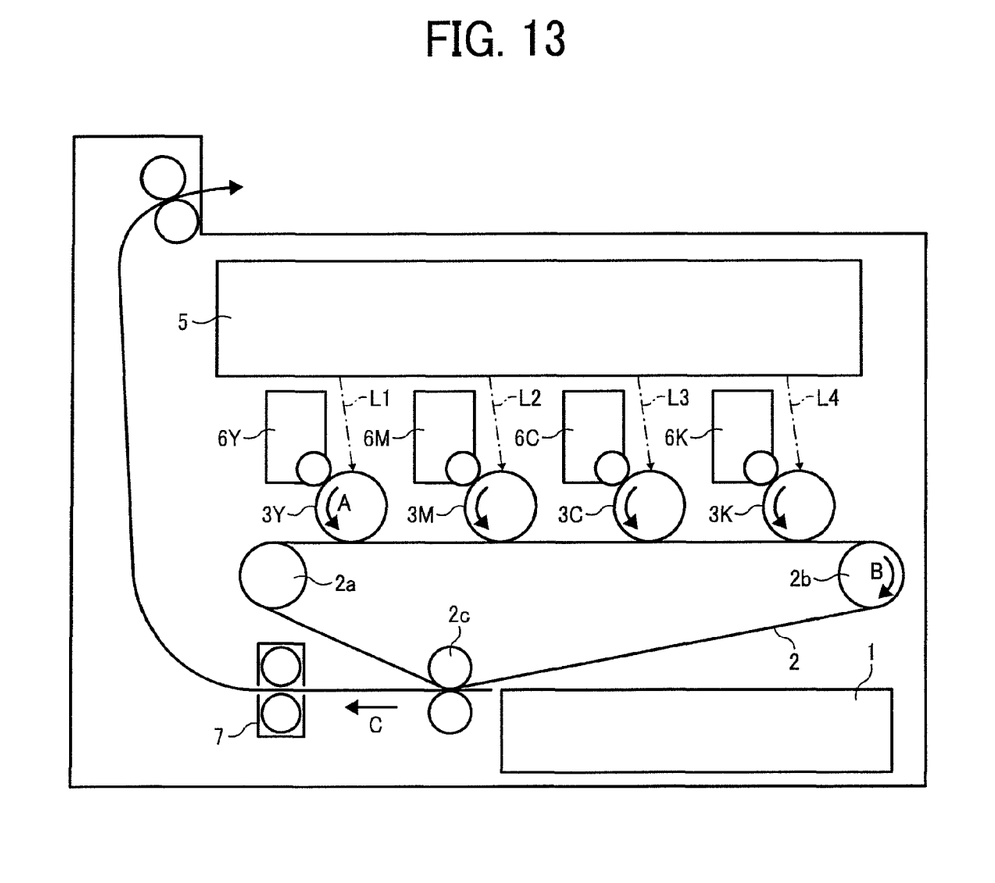
FIG. 13 is a schematic diagram of a tandem-type color image forming apparatus that uses the optical scanning device.

FIG. 13 is a schematic diagram of a tandem-type color image forming apparatus that uses the optical scanning device 5. The photosensitive elements 3Y, 3M, 3C, and 3K are arranged in parallel in the color image forming apparatus. The optical scanning device 5, developing devices 6Y, 6M, 6C, and 6K, the photosensitive elements 3Y, 3M, 3C, and 3K, the intermediate transfer belt 2, a fixing device 7, and a feed tray 1 are arranged from the upper portion of the color image forming apparatus in this order.

Above the intermediate transfer belt 2 supported by a pair of rollers 2a and 2b and a roller 2c such that the upper surface of the intermediate transfer belt 2 is flatly arranged, the photosensitive elements 3Y, 3M, 3C, and 3K are arranged adjacent to the upper surface of the intermediate transfer belt 2 in order along the moving direction of the intermediate transfer belt 2 at equal intervals. The photosensitive elements 3Y, 3M, 3C, and 3K are formed to have the same diameter. Process units that sequentially perform an electrophotographic process are arranged around the photosensitive elements 3Y, 3M, 3C, and 3K in the rotation direction of the photosensitive elements 3Y, 3M, 3C, and 3K. For example, a charger (not shown), an exposure unit that is scanned with the laser beam L1 emitted by the optical scanning device 5 based on an image signal, the developing device 6Y, a transfer charger (not shown), the cleaning device, and the like, are sequentially arranged around the photosensitive element 3Y. The photosensitive elements 3M, 3C, and 3K have the same configuration. Each of the photosensitive elements 3Y, 3M, 3C, and 3K has a target surface arranged for each of the colors, and the target surfaces of the photosensitive elements 3Y, 3M, 3C, and 3K are scanned with the laser beams L1, L2, L3, and L4 emitted by the optical scanning device 5.

An image forming process and a color-image forming process are performed on each of the photosensitive elements 3Y, 3M, 3C, and 3K as described below. For example, after the photosensitive element 3Y is uniformly charged by the charger, the target surface of the photosensitive element 3Y is scanned with the laser beam L1 in the main-scanning direction and the photosensitive element 3Y is rotated in the direction indicated with an arrow A shown in FIG. 13 for the sub-scanning operation so that an electrostatic latent image is formed on the surface of the photosensitive element 3Y. The developing device 6Y that supplies toner to the photosensitive element 3Y is arranged downstream of the exposure position of the laser beam L1 emitted by the optical scanning device 5 in the rotation direction of the photosensitive element 3Y whereby yellow toner is supplied from the developing device 6Y to the surface of the photosensitive element 3Y. The toner supplied from the developing device 6Y adheres to a portion on which the electrostatic latent image is formed, whereby a toner image is formed. In the same manner, toner images in magenta, yellow, and black are formed on the photosensitive elements 3M, 3C, and 3K.

The upper surface of the intermediate transfer belt 2 is located downstream of the arrangement position of the developing device 6Y in the rotation direction of the photosensitive element 3Y. The intermediate transfer belt 2 is supported by the rollers 2a, 2b, and 2c and moved in the direction indicated with an arrow B shown in FIG. 13 by a motor (not shown). The intermediate transfer belt 2 is moved along the photosensitive elements 3Y, 3M, 3C, and 3K in order, and the toner images developed on the photosensitive elements 3Y, 3M, 3C, and 3K are sequentially transferred onto the intermediate transfer belt 2 in a superimposed manner, whereby a color image is formed on the intermediate transfer belt 2. Afterward, a recording medium is fed from the feed tray 1 in the direction indicated with an arrow C shown in FIG. 13, and the color image formed on the intermediate transfer belt 2 is transferred onto the recording medium. The fixing device 7 fixes the color image to the recording medium, and then the recording medium is discharged. After the image is transferred, residual toner on the photosensitive elements 3Y, 3M, 3C, and 3K and the intermediate transfer belt 2 is removed by the cleaning device.

According to one aspect of the present invention, it is possible to prevent an increase in the size of the drive circuit that drives a light deflector and an increase in heat generation. Thus, an increase in temperature of an optical scanning device can be prevented and the optical scanning operation can be performed with high accuracy without degradation of optical scanning characteristics.

Furthermore, according to another aspect of the present invention, it is possible to eliminate the need for performing an offset control operation in the control circuit that controls the vibrating mirror and adjust the offset regardless of the electric current (voltage rating) applied to the vibrating mirror.

Moreover, according to still another aspect of the present invention, it is possible to detect the offset with high accuracy.

Furthermore, according to still another aspect of the present invention, it is possible to prevent displacement of a beam spot with time and, if the optical scanning device is used in a color image forming apparatus, it is possible to achieve high image quality due to a reduction in color shift of formed images and to achieve a quiet operation.

Moreover, according to still another aspect of the present invention, a color image forming apparatus can reduce color shift.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that deflects a light beam emitted from a light source device by a vibrating mirror, scans a scanning surface with deflected light beam, and focuses the light beam onto the scanning surface by a scanning imaging optical system, the optical scanning device comprising:
    an offset detecting unit that detects an offset that is a deviation between a center of vibration amplitude of the vibrating mirror and a center of an optical scanning area; and
    an adjusting unit that adjusts the center of the vibration amplitude, using a mechanism that rotates a support for the vibrating mirror about a rotation axis that corresponds to the vibration axis of the vibrating mirror, when the offset detected by the offset detecting unit is larger than a predetermined value, and
    wherein the offset detecting unit calculates an average of a difference between a first amplitude output from a first light receiving element and a second amplitude output from a second light receiving element for each corresponding pair of the first amplitude and the second amplitude, and when the average falls outside an offset tolerance, the adjusting unit adjusts the center of the vibration amplitude.

2. The optical scanning device according to claim 1, wherein the center of the optical scanning area is a center of a main-scanning area between the first light receiving element and the second light receiving element.

* * * * *